FIG. I

INVENTORS
KENNETH A. BLENKARN
DAVID A. DIXON
BY
*John D. Gassett*
ATTORNEY

INVENTORS
KENNETH A. BLENKARN
DAVID A. DIXON
BY
John D. Gassett
ATTORNEY

INVENTORS
KENNETH A. BLENKARN
DAVID A. DIXON
ATTORNEY

United States Patent Office 3,559,410
Patented Feb. 2, 1971

3,559,410
SYSTEM FOR RELIEVING STRESS AT THE TOP AND BOTTOM OF VERTICAL TUBULAR MEMBERS IN VERTICALLY MOORED PLATFORMS

Kenneth A. Blenkarn and David A. Dixon, Tulsa, Okla., assignors to Pan American Petroleum Corporation, Tulsa, Okla., a corporation of Delaware
Filed July 30, 1968, Ser. No. 748,867
Int. Cl. B63b *35/44, 21/00*
U.S. Cl. 61—46.5      12 Claims

ABSTRACT OF THE DISCLOSURE

Structure for relieving stresses at the top and bottom of elongated tubular members used to connect floating structure supported by a body of water to anchors on the floor thereof. Stop means surround each such connecting tubular member near each end thereof to limit the angular deflection of the tubular member at that point.

---

This invention relates to structures for relieving stresses at the top and bottom of an elongated tubular member which is used to connect a floating structure supported by a body of water to anchors in the floor thereof.

BACKGROUND OF THE INVENTION

In recent years there has been considerable attention attracted to the drilling and production of wells located in water, such as offshore in the Gulf of Mexico. Wells may be drilled in the ocean floor from either fixed platforms in relatively shallow water or from floating structures or vessels in deeper water. Fixed platforms usually consist of a working platform supported above the surface of the body of water by a plurality of piles or columns extending from the platform to the ocean floor. This works fairly well in shallow water, but as the water gets deeper the problems of design and accompanying costs become prohibitive. In deeper water it is common practice to drill from a floating vessel.

In recent years there has been some attention directed toward many different kinds of floating structures. One kind which is attracting attention is the so-called vertically moored platform. An especially attractive vertically moored platform is described in copending application S.N. 754,628 filed Aug. 22, 1968 assigned to the same assignee as this application. A key feature of the vertically moored platform is that the floating platform is connected to anchors only by elongated parallel members such as pipe. In a preferred form the buoyancy means comprises a plurality, at least three, elongated buoyant cylinders which are supported in an upright position and are held to the ocean floor by elongated members. One feature of such platforms is that they have relatively weak buoyancy restoration forces in the vertical direction. This means structures of this type respond dramatically to changes in vertical load. Use of such a structure as a platform from which to conduct offshore activities is restricted to the extent that special provisions must be made to account for variable weights. Such variable weight can arise for variations in consumables (such as fuel oil) and from changes in hook load (weight of pipe, etc.) when such a floating structure is utilized for drilling or workover operations. A remedy to the limited buoyancy restoration feature is to provide excess buoyancy and to moor the floating structure vertically and rigidly to the ocean floor. In such a vertically moored floating platform, wave induced excursion causes angular distortion of the vertical elongated member. In such vertically moored platform it is usually desired to maintain the elongated members interconnecting the platform anchored in the ocean floor under a substantial amount of tension.

As these connecting pipes are then under tension and also subjected to an angular rotation caused by the excursion of the waves, the influence of tension is to concentrate the angular rotation at the ends of the pipe. This invention recognizes these stresses and also offers means or structures whereby these stresses are minimized.

BRIEF DESCRIPTION OF THE INVENTION

This invention concerns structure for relieving the stresses near the ends of tubular members used to connect a floating structure to the ocean floor. These vertical support pipes are also sometimes called "riser pipes." Stop means surround each such tubular member near each end so as to limit the angular deflection of that tubular member at such point. Means are provided to support the stop means for the upper end of the tubular member from such floating structure and for supporting the stop means at the lower end from the floor of the body of water.

In an especially preferred embodiment the stop means takes the form of a ring member surrounding each end of such elongated tubular member and a diaphragm within the ring-like member. The outer periphery of the diaphragm is secured to the ring-like member and the elongated members pass through the diaphragm in intimate contact therewith. The ring-type member is secured from the base or the platform by means hereinafter described.

Various objects and a better understanding of the invention can be had from the following description taken in conjunction with the drawings.

DETAILED DESCRIPTION

Figure 1:
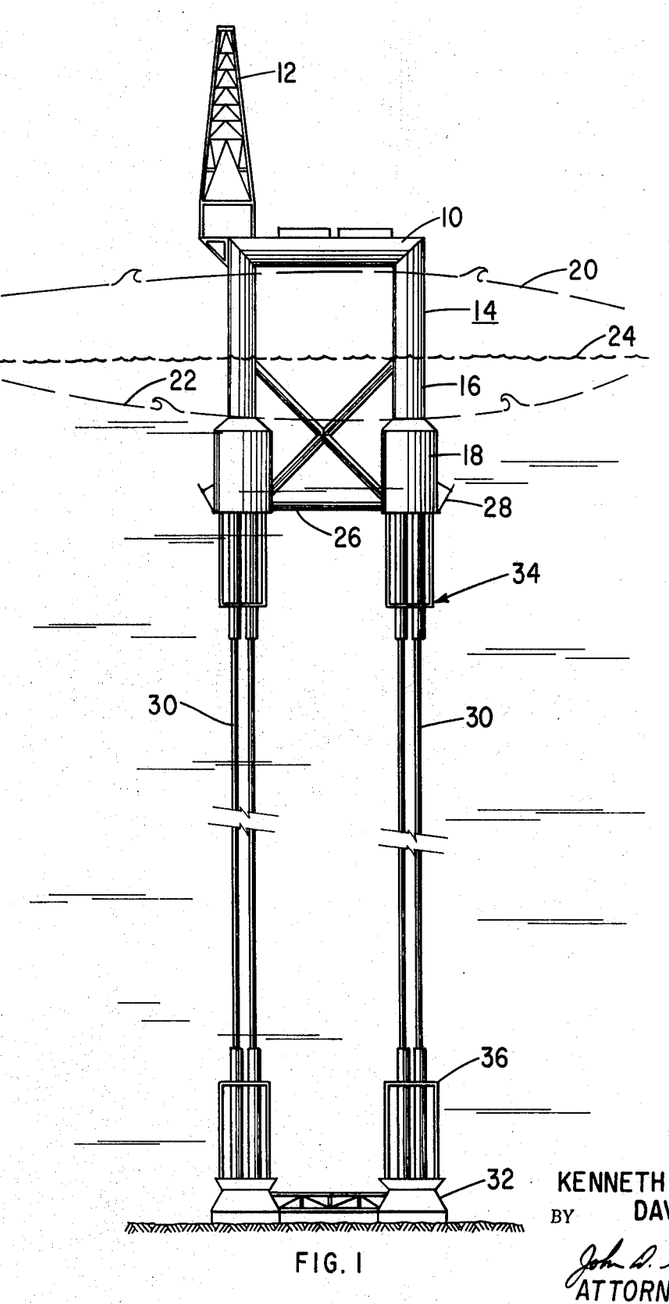
FIG. 1 illustrates a vertically moored platform with stops near the terminals of the riser pipe connectors to relieve stress.

Attention is first directed to FIG. 1 which shows an overall vertically moored system having means for minimizing the stresses in the ends thereof. Shown in FIG. 1 is a work platform 10 having a derrick 12 mounted thereon and supported by a plurality of elongated vertical float means 14. There are preferably four of these. These float means are preferably made in the general manner indicated in FIG. 1 and more specifically are made along the criteria given in the co-pending patent application Ser. No. 754,628 supra. These vertical floats have an upper section 16 and a large lower section 18. However, the system of this invention itself is useful with any vertically moored platform. In designing marine structures, it is usually necessary to base the design at least partially on what is known as a design wave. The design wave in this case is illustrated as having a crest 20 and a trough 22. The still water line is indicated at 24. The various vertical float members are connected by braces 26. Further, adjustable fins 28 are provided on enlarged portion 18 of the float in the event it is desired to change the vertical drag and hydrodynamic inertial forces. It will be noted that vertical drag and hydrodynamic force occur due to the wave action when vertical motion is imparted to the water. The floating platform is connected to the ocean floor by a plurality of vertical riser pipes 30. The size of these will, of course, depend upon the number and total strength required. Typically, they may be made of common structural steel, about 20 inches in diameter and with a wall thickness of about 5/8 inch. These pipes 30 extend down through template 32 deep into the ocean floor, as will be discussed more fully hereinafter. It is sufficient to say that they extend sufficiently deep into the ocean floor so as to form a dependable anchor.

These pipes 30 are under tension due to the upward force of the buoyancy means 14. They are also inclined by horizontal motion of the platform due to ocean waves. For pipes under tension, such as pipes 30, inclination subjects the ends to an angular rotation or flexure.

Shown in FIG. 1 are elastic riser support termination means 34 supported from the lower end of vertical floats 14. At the lower end of riser 30 are lower elastic riser support terminations 36 which are supported from the template foundation 32. There are disclosed in this invention various type elastic support terminations and the particular one shown in FIG. 2 will be discussed next.

Figure 2:
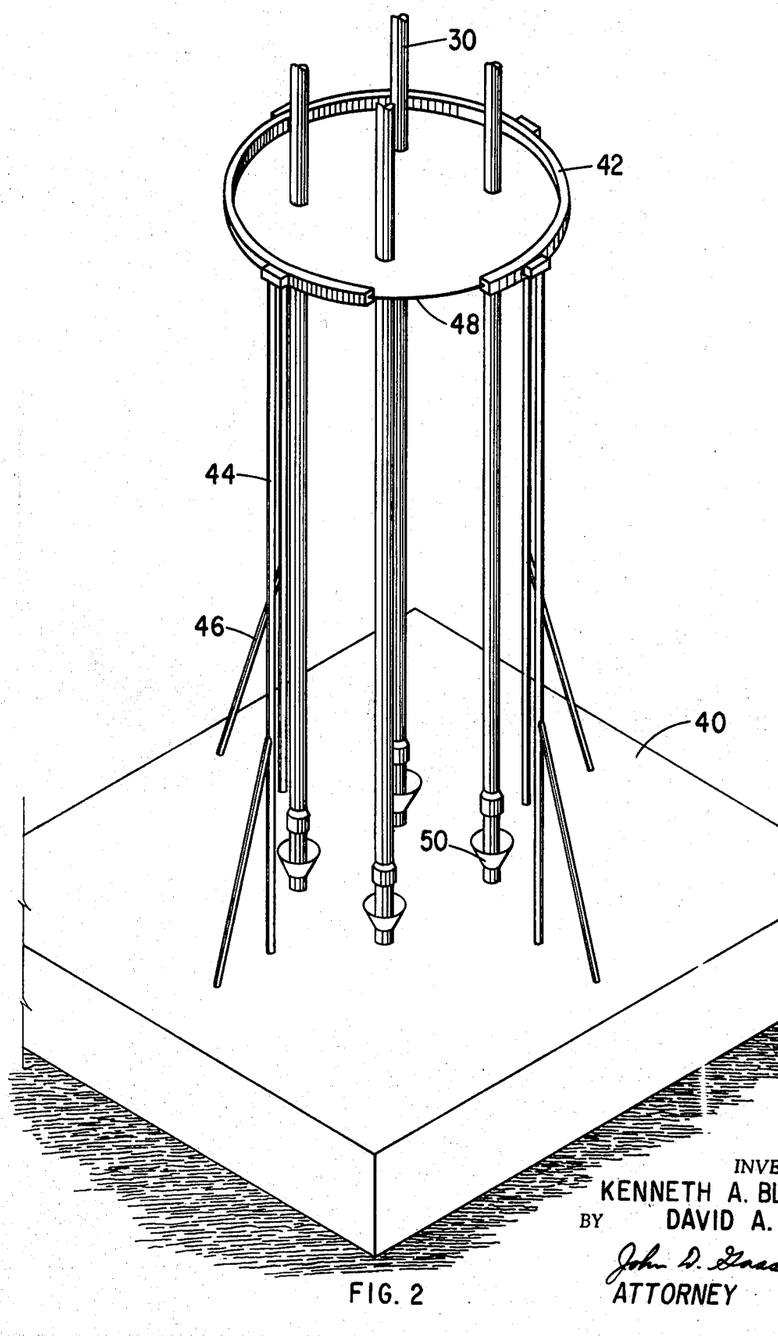
FIG. 2 illustrates a preferred type elastic stop in which the riser pipe passes through a diaphragm.

FIG. 2 illustrates a spring or elastic restraining system which is external of the connecting riser pipes. Shown in FIG. 2 are a plurality of connecting riser pipes 30 which correspond to the riser pipes of FIG. 1. These riser pipes extend downwardly through anchor base 40. Supported above base 40 is a ring 42 which surrounds the riser pipes 30. The ring is elastically supported from base 40 by upright members 44 and braces 46. The flexibility of the upright member is discussed later in regard to Equation 2. Ring 42 supports diaphragm 48. This diaphragm 48 can be a sheet of steel, for example, and may be up to one inch in thickness. Typically, the diameter of ring 42 is between 15 and 20 feet. The riser pipes 30 pass through the diaphragm 48 in intimate contact therewith. Diaphragm 48 provides adequate transfer of load in the horizontal direction but does not impose bending moment restraint on the riser pipes 30. Generally speaking, ring 42 is placed at the vertical elevation somewhat above the region of flexure at the end of the riser. An equation for determining this position is given later. Although the system in FIG. 2 is shown supported from the ocean floor, a similar inverted system is supported from the vertical floats to support the upper terminal of the riser pipe 30. Riser pipes 30 pass through guide funnel means 50 and anchor base 40 and extend deep into the ocean floor.

Attention will now be directed toward a discussion of the most efficient use of the elastic stress reliever such as shown in FIG. 2. (This same discussion is also applicable to the embodiment shown in FIG. 4 and discussed later.) The most efficient use is achieved if the stress relieving structure, i.e., diaphragm 48, is positioned such that the maximum bending stress in the elongated member at its end and at the reaction point with the diaphragm (or ring 70 of FIG. 4) are equal to each other and to the maximum allowable bending stress for this particular elongated member when the platform 10 is at its maximum lateral excursion.

Figure 4:
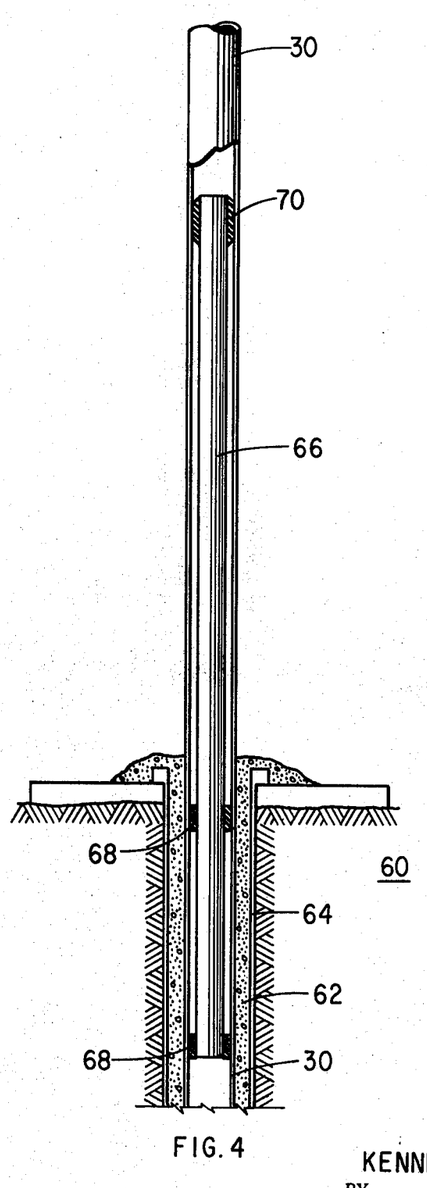
FIG. 4 is another form of structure (post type) for relieving the stress in the terminal end of the riser pipe.

The diaphragm 48 in FIG. 2 (or centralizer 70 in FIG. 4) is located a distance A from the end of the elongated member where A is selected to satisfy the Equation 1:

(1)
$$M_{all.} = \left(\frac{H}{\gamma}\right) \left\{ \frac{\text{Sinh } (\gamma A) \cdot \text{Sinh } (\gamma b)}{\text{Sinh } (\gamma L) + \text{Sinh } (\gamma b)[\text{Cosh } (\gamma A) - 2]} \right\}$$

where

H is the maximum horizontal component of the total force in the elongated member at its midpoint, $M_{all.}$ is the allowable bending moment in the elongated member, and is determined directly from the allowable bending stress, T is the tension in the elongated member, L is normally taken to be one-half of the total length of the elongated member, $b = L - A$ $\gamma = \sqrt{T/EI}$ E is the elastic modulus of the material making up the elongated member, and I is the cross-sectional moment of inertia of the elongated member.

The optimum flexibility of the elastic support structure, e.g., members 44, 46, is given by Equation 2:

(2)
$$K = \frac{T}{A} \left\{ \frac{\text{Sinh } (\gamma L) - \text{Sinh } (\gamma b)}{\text{Sinh } (\gamma b)[\text{Cosh } (\gamma A) - 1]} \right\}$$

The spring constant K which relates the spring reaction per unit lateral excursion of the reaction point per riser at distance A which is the distance from the end of the elongated member to the diaphragm, is provided by the response of the supporting structure 44 and 46.

The relationship between the maximum lateral excursion X of the midpoint of the elongated member and the maximum horizontal component of the total force H in the elongated member at its midpoint is given by Equation 3:

(3)
$$X = \left(\frac{H}{T}\right) \left\{ L - \frac{1}{\gamma} [\text{Tanh } (\gamma L) + R \cdot Q] \right\}$$

where $$Q = \left\{ (\gamma A) - \text{Tanh } (\gamma L) + \frac{\text{Sinh } (\gamma b)}{\text{Cosh } (\gamma L)} \right\}$$

$$R = \frac{\text{Sinh } (\gamma L) - \text{Sinh } (\gamma b)}{\{\text{Sinh } (\gamma L) + \text{Sinh } (\gamma b) [\text{Cosh } (\gamma A) - 2]\}}$$

Figure 3:
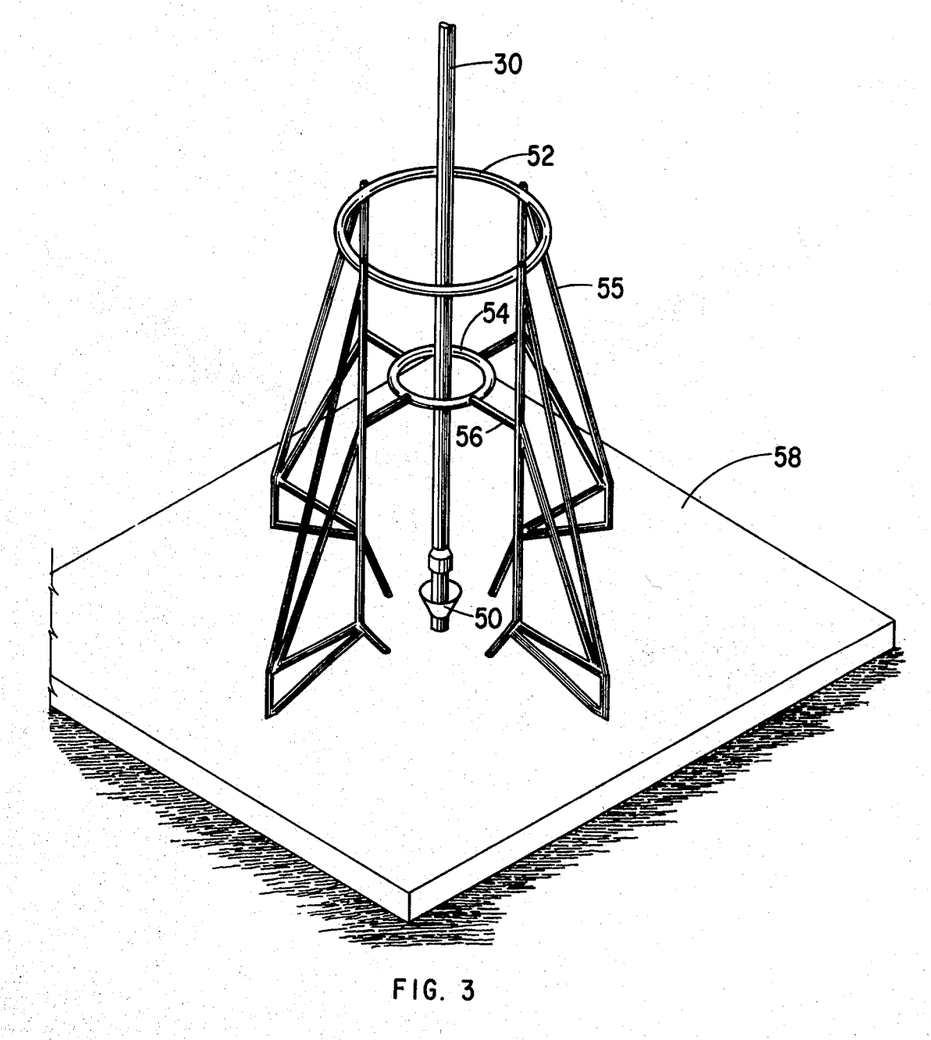
FIG. 3 illustrates another embodiment of stops which comprises spaced-apart, different size rings surrounding the riser pipe near the ends thereof.

FIG. 3 illustrates another embodiment for relieving the stresses caused by the angular rotation of the pipe under tension. In this system, riser pipe 30 is surrounded by an upper ring 62 and a lower ring 64. These rings are held rigidly in place by braces 55 and 56 from base 58 which rests on the ocean floor. As shown in the drawing, ring 54 is of smaller diameter than ring 52. The reason for this will be apparent from the following discussion. The amount of deflection which a pipe can take at a given point without breaking or being overstressed is generally known for most grades of steel and common sizes of tubular goods. Lower ring 54 is arranged in a vertical position where the first "dogleg" (concentration of angular stresses) in riser 30, other than at the very end thereof, might be said to develop. The diameter of ring 54 is such that when riser 30 contacts ring 54 it will not have exceeded the permissible deflection. Once pipe 30 has contacted ring 54 in this angular deflection, then ring 54 can serve as the base point and ring 52 is provided above ring 54 a distance to obtain the elevation at which the next dogleg will occur on riser pipe 30. The diameter of ring 52 is such that it will stop the rotation of pipe 30 about a point on the same elevation as ring 52 to limit that angular deflection. The effects of rings 54 and 52 are accumulative. As many stops 52, 54 as desired can be used.

Attention will now be directed to a consideration of a structure for relieving stresses at the top and bottom of an elongated tubular member which comprises a single stop means made up of a single ring surrounding elongated member 30; for example, if ring 54 and braces 56 were removed from the embodiment of FIG. 3. Such a structure will perform most suitably if it is designed such that the maximum bending stress in the elongated member at its end and the maximum bending stress in the elongated member at the elevation where it contacts the stop are (1) of equal magnitude and (2) both equal the allowable bending stress for the material making up the elongated member. One convenient manner in which this is achieved is to locate the ring a distance A from the end of the elongated member where A is selected to satisfy Equation 4:

(4)
$$M_{all.} = \left(\frac{H}{\gamma}\right)\left[\frac{1}{1+2 \cdot \text{Tanh}\left(\frac{\gamma A}{2}\right)}\right]$$

where the terms have the meanings given above.

The innermost radius of this ring R is given by Equation 5:

(5)
$$R = \left(\frac{H}{T}\right)\left[\frac{A \cdot \text{Tanh}\left(\frac{\gamma A}{2}\right)}{2\,\text{Tanh}\left(\frac{\gamma A}{2}\right)+1}\right]$$

The reaction F which must be sustained by this ring and its supporting structure is given by Equation 6:

(6)
$$F = H\left\{\frac{\text{Tanh}\left(\frac{\gamma A}{2}\right)+1}{2 \cdot \text{Tanh}\left(\frac{\gamma A}{2}\right)+1}\right\}$$

The relationship between the maximum lateral excursion, X, of the midpoint of the elongated member and the maximum horizontal component H of the total force in the elongated member at its midpoint in length is given by Equation 7:

(7)
$$X = \left(\frac{H}{T}\right)\left\{\left(L+\frac{A}{2}\right) - \frac{\left(\frac{A}{2}+\frac{1}{\gamma}\right)}{\left[1+2\cdot\text{Tanh}\frac{\gamma A}{2}\right]}\right\}$$

where

L is the distance from the end of the elongated member to its midpoint, or in other words, one-half of the total length of the elongated member, and
X is about one-half of the lateral excursion of the platform (because of symmetry).

The stop means shown in FIG. 3 comprises a first ring 52 and a second ring 54 where the second ring is between the first ring and the end of the elongated member. The second ring is also smaller in diameter than the first ring. This stop means of two such rings will perform most efficiently in this structure is designed such that the maximum bending stress in the elongated member at its end and the maximum bending stresses in the elongated member at the elevations of its contact with the first and second ring are all equal in magnitude and that all three of these stresses in the elongated member are equal to the allowable bending stress for the material making up the elongated member. One manner in which this is accomplished is to place the second ring equidistant between the end of the elongated member and the first ring. Where the distance between the end of the elongated member and the second ring is A and, consequently, the distance between the second ring and the first ring is also A, then, A is selected to satisfy Equation 8:

(8)
$$M_{all.} = \left(\frac{H}{\gamma}\right)\frac{1}{\left[4\cdot\text{Tanh}\left(\frac{\gamma A}{2}\right)+1\right]}$$

where $M_{all.}$, H and $\gamma$ have all been defined above.

The innermost radius of the first ring $R_1$ is given by Equation 9:

(9)
$$R_1 = \left(\frac{H}{T}\right)\frac{4A \cdot \text{Tanh}\left(\frac{\gamma A}{2}\right)}{\left[4\,\text{Tanh}\left(\frac{\gamma A}{2}\right)+1\right]}$$

The innermost radius of the second ring $R_2$ is given by Equation 10:

(10) $\qquad R_2 = \frac{1}{4} \cdot R_1$

The lateral force $F_1$ which must be reacted by the first ring is given by Equation 11:

(11)
$$F_1 = H\left\{\frac{\text{Tanh}\left(\frac{\gamma A}{2}\right)+1}{4\cdot\text{Tanh}\left(\frac{\gamma A}{2}\right)+1}\right\}$$

and the force $F_2$ on the second ring is given by Equation 12:

(12)
$$F_2 = H\left\{\frac{2\cdot\text{Tanh}\left(\frac{\gamma A}{2}\right)}{4\cdot\text{Tanh}\left(\frac{\gamma A}{2}\right)+1}\right\}$$

The relationship between the maximum lateral excursion of the midpoint of the elongated member, X, and the maximum horizontal component H of the total force in the elongated member at its midpoint is given by Equation 13:

(13)
$$X = \left(\frac{H}{T}\right)\left\{(L+A) - \frac{\left(A+\frac{1}{\gamma}\right)}{\left[4\cdot\text{Tanh}\frac{\gamma A}{2}+1\right]}\right\}$$

where L is defined above.

Attention is next directed to FIG. 4 which is an internal cantilever spring system which is designed to provide an appropriate amount of restraint on the riser itself at the proper elevation shown in FIG. 4. Riser pipe 30 extends into the earth 60 up to 500 to 1,000 feet, for example. This riser pipe 30 is cemented into place by cement 62 which fills the annular space between the riser pipe 30 and surface conductor pipe 64 which is driven into the ground such as by pile driving, drilling in or other conventional means. Mounted inside riser pipe 30 is a cantilever spring which takes the form of a vertical post 66. This spring 66 is supported within conduit 30 by lower centralizers 68 which are below the ocean floor. The upper end of post 66 extends upwardly to a point at which it is desired to have an elastic support for riser 30. At this point an elastic packer such as a rubber ring 70 is set in the annulus between post 66 and the interior of riser pipe 30. If post 66 is hollow, drilling and production operations can be carried out through the riser pipe 30 and the interior of post 66 by use of tubing, production strings, drill pipe, etc.

The rubber ring 70 of the embodiment of FIG. 4 is located at positions at levels determined in the same manner as the level of the diaphragm 48 of FIG. 2. This has been discussed in detail above in connection with Equations 1, 2 and 3. The flexibility of post 66 is determined by "spring constant" Equation 2.

Figure 7:
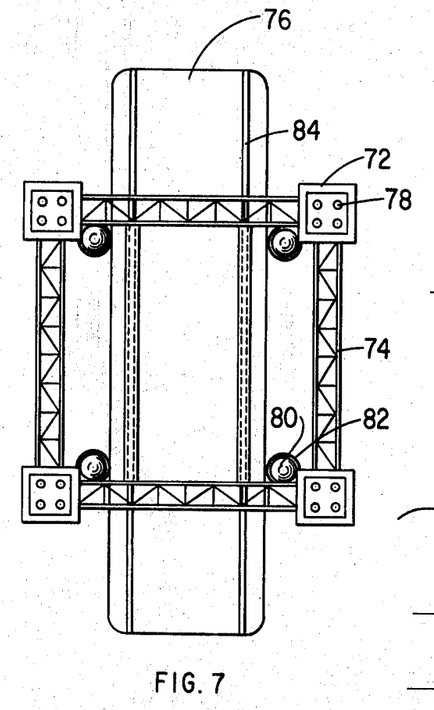
FIG. 7 illustrates a square template supported on a barge.
Figure 8:
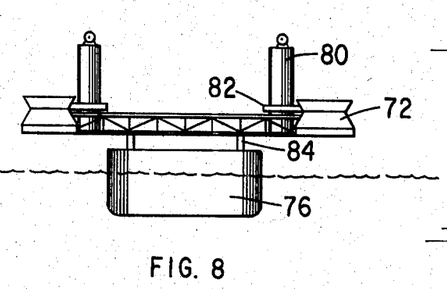
FIG. 8 is an end view of FIG. 7.

It is important that the interconnecting riser pipes be spaced properly at the point they enter the ocean floor. To accomplish this, it is convenient to provide a master template such as shown in FIG. 7. In FIG. 7 there are four corner templates 72 connected by rigid bracing 74 to form the overall or master template. This master template is supported from a floating barge 76. Each corner template 72 has four funnel guide passages 78 through which the riser pipes 30 will pass. Each corner of the master template is provided with a vertical float 80 held to the template with brackets 82. These brackets are of the type which can automatically and rapidly release the floats 80 from the template. Suitable means are explosive type bolts. The templates are shown in FIG. 7. Barge 76 is provided with tracks or rails 84 for supporting the template.

Figure 9:
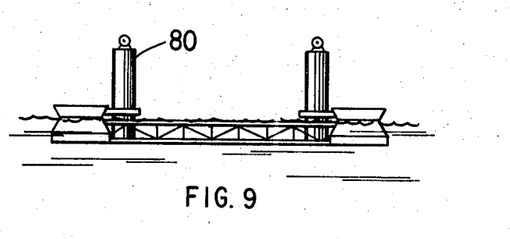
FIG. 9 shows the template supported by floats free of the barge.
Figure 10:
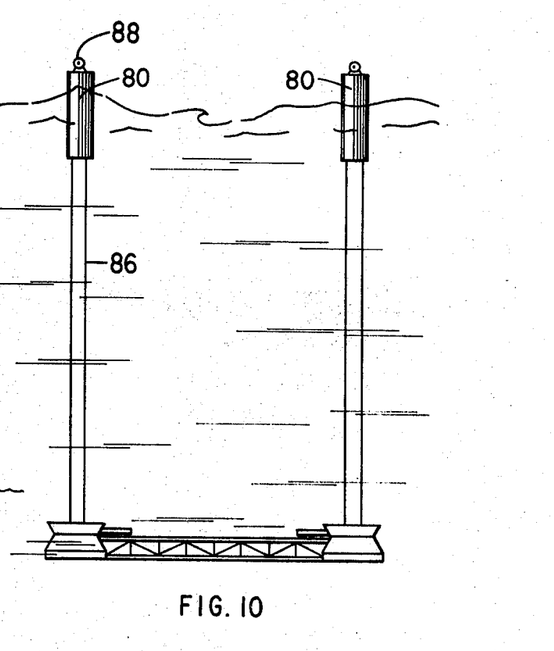
FIG. 10 illustrates the template on the ocean floor.

In operation, barge 76 is used to transport the master template to proper location. When it reaches the proper location the template is lifted off the barge either by an accompanying crane or slid off the end in any known manner as by sliding down rails 84. When the template is free of the barge, it is supported by the floats 80 as shown in FIG. 9. As shown in FIG. 9, floats 80 are still rigidly attached by brackets 82 to the master template. When it is desired to lower the template to the ocean floor, it is made certain that guide lines 86 are first connected to winch means 88 on the top of floats 80. The lower ends of the guide lines 86 are connected to the template columns, details of which are clearly shown in FIG. 5. At this time the floats 80 are released from their template. Then by controlling the winches 88 on each float 80, the master template is lowered to the ocean floor. At this point it takes the general appearance as shown in FIG. 10.

Figure 5:
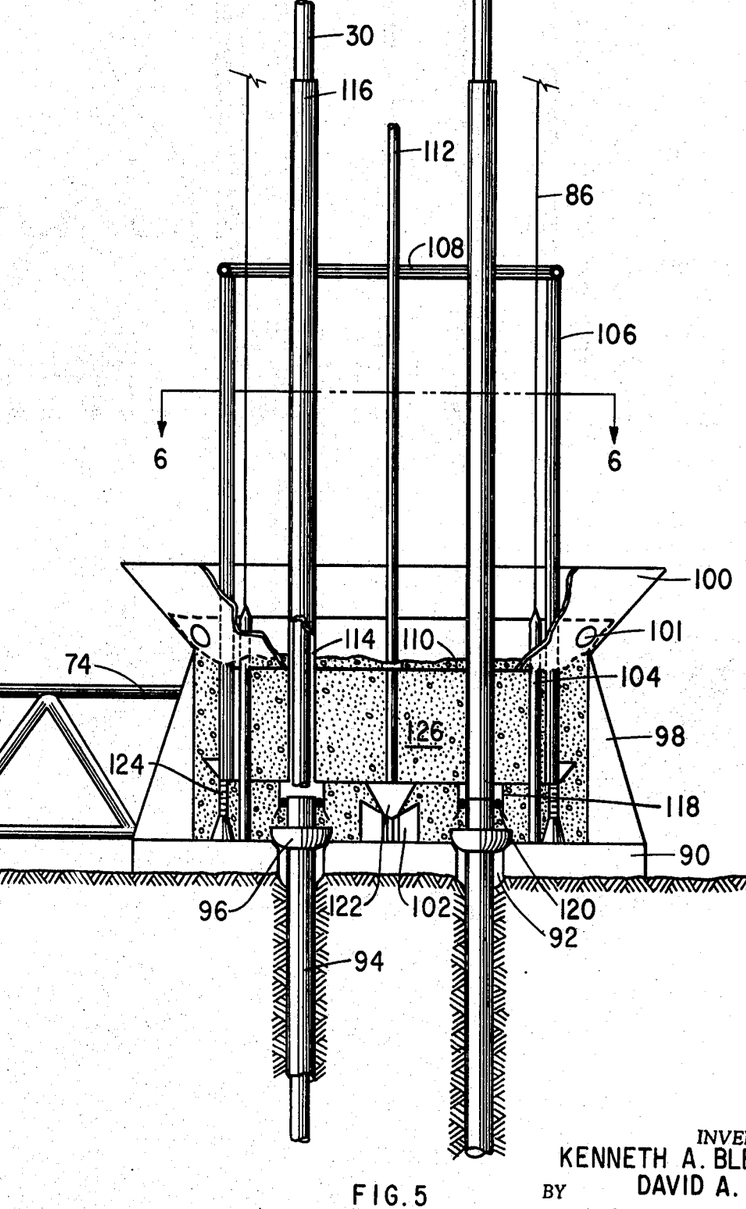
FIG. 5 shows details of attaching a cluster of riser pipes to the ocean floor.
Figure 6:
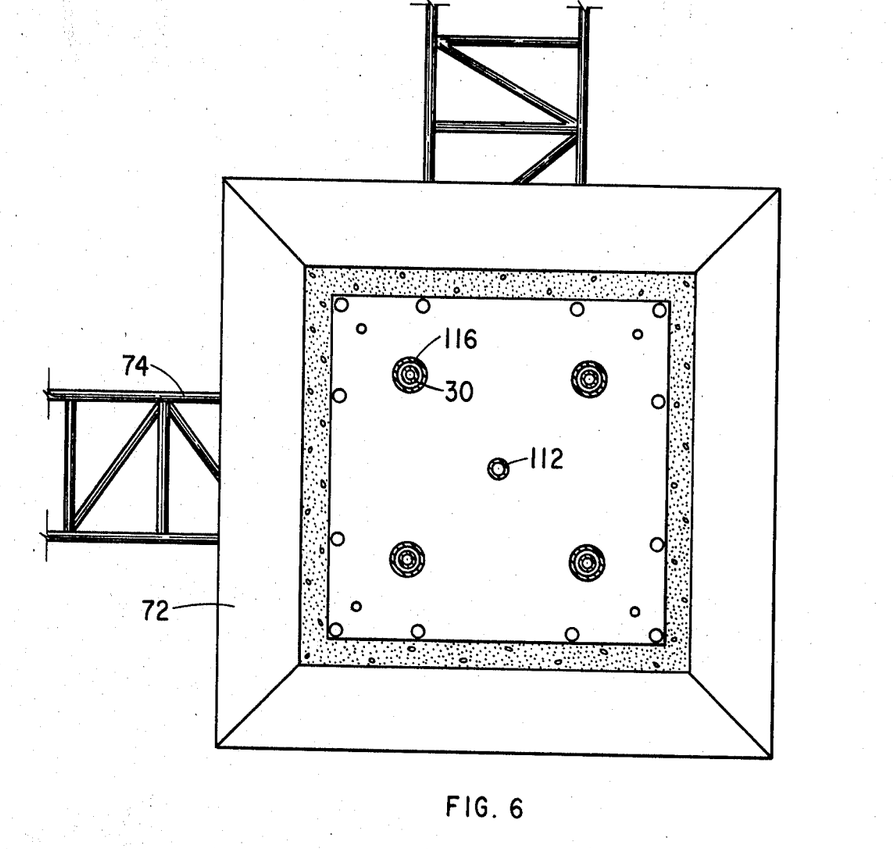
FIG. 6 is a cross section taken across the line 6—6 of FIG. 5.

Attention is next directed to FIG. 5 which shown a vertical view, partly in section, through a typical corner template 72. This shows the riser pipe and an elastic support all in place. These elements will be described now and then the procedure for getting them into position will be briefly discussed. The template includes a base plate element 90 having vertical holes 92 therethrough through which surface conduit 94 passes. The upper end of passage 92 has a ball element 96 for marine conductor 94 hanger. A "monument" shell 98 is provided above base plate 90 and a guide cone element 100 is provided on the top of monument shell 98. The bottom of shell 98 is provided with a center guide 102 which has a stabbing point and a latch. Also connected to the element 90 are guide posts 104 to which guide lines 86 are connected.

We will next discuss the so-called "elastic support" shown in FIG. 5. That includes upright members 106, ring 108. These are secured to an elastic support base structure 110 which is secured to a lowering line 112. This elastic support base structure 110 has vertical passages 114 therethrough for each termination section 116. The lower end of elastic base support structure 110 is provided with an inverted funnel type conduit extension 118 having seals 120. The lower end of such elastic support base is also provided with a stabbing member 122 which mates with a central guide and swivel element 102 of the template. There are also provided hydraulic jacks 124 for leveling the elastic support assembly.

In discussing the features of FIG. 5 it is convenient to think of them as those elements which are a part of the template and conductor pipe and that second group which is the elastic support assembly. The elastic support assembly includes the elastic support base structure 110, upright members 106 for the ring stop 108, lowering line 112, termination sections 116 and stabbing means 122.

Attention will now be directed briefly toward procedure for installing the system of FIG. 5. First, the template is launched as described above in connection with FIGS. 7, 8, 9 and 10. Next, by using guide lines 86 the holes for conductor pipes 94 are made through openings 92 in base plate 90 by either drilling in or washing in in the conventional manner. The conductor pipes are then set in such manner. This is done for each hole in base plate 90 in each corner template; however, only one corner template is discussed here for simplification. Next, lower the elastic support assembly by lowering line 112 and using guide lines 86 to insure proper alignment with the said template structure. The elastic support assembly is lowered until the stabbing point 122 enters the proper center guide 102. It is continually lowered so that the conductor extensions 118, which are part of the elastic support assembly, are lowered over the upper end of the conductor pipe 94 which extends just upwardly through holes 92.

We next level the elastic support assembly by proper adjustment of hydraulic jacks 124. At the point when it is properly leveled, cement grout or concrete 126 is pumped in to fill the template shell 98 to above ports 101 in guide 100.

Guide lines 86 are next used to stab drilling equipment in through termination sections 116 so that the holes to the riser pipes 30 can be drilled down through conductor pipe 94. When sufficient depth, e.g., 500 to 1,000 feet, has been drilled, then riser pipes 30 are placed in the hole and cemented in place. The foundation is now complete and further drilling operations and production operations can proceed through riser pipes 30.

Figure 11:
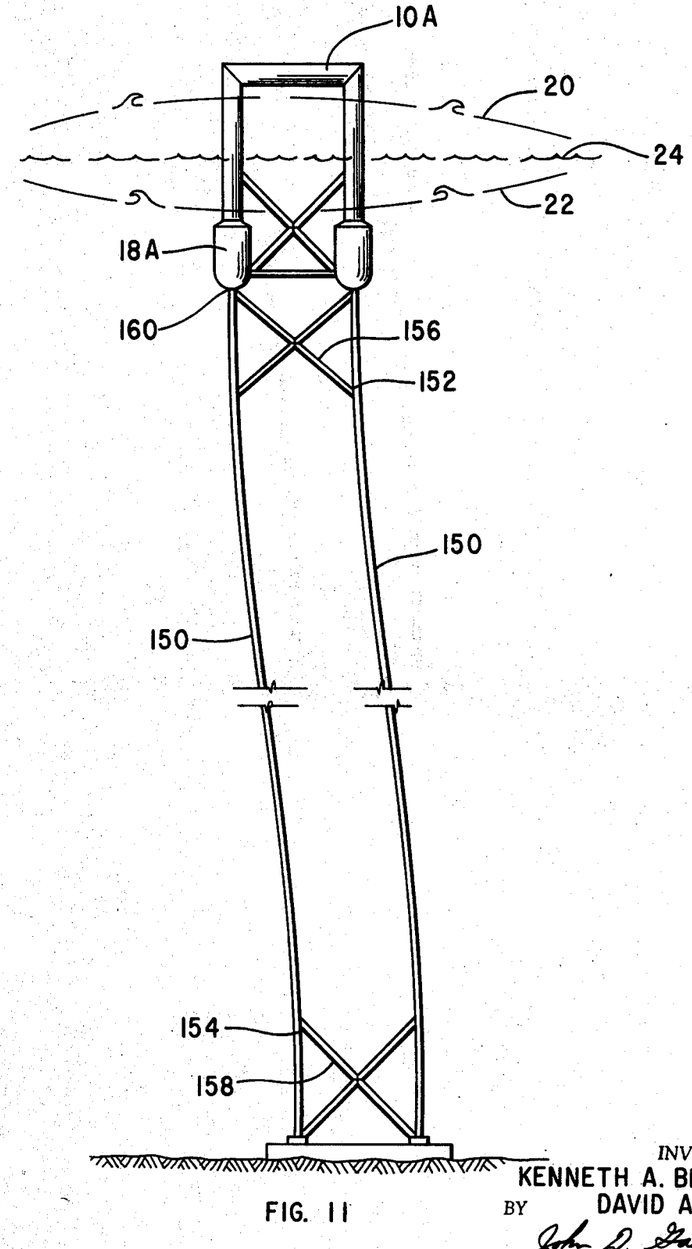
FIG. 11 illustrates a particular stop means in the form of cross bracing of the risers near the terminations of the riser pipe connectors to relieve stress.

Attention is next directed to FIG. 11 for another system of relieving the stresses in vertical elongated riser pipes 150. Cross bracing is provided at points 152 near the upper end of the risers and points 154 near the lower end thereof. These points correspond to the level of elastic riser support termination means 34 and of lower elastic riser termination means 36 in FIG. 1. These are braced with cross bracing 156 and 158, respectively. Bracing 156 goes, for example, from point 152 to point 160 which is just adjacent the connection of riser pipe 150 with the vertical float 18A.

The system of FIG. 11 permits greater lateral deflection of the platform 10A with reduced tension in the riser pipes 150 and without overstressing such risers.

In effect, the end of the elongated member has been shifted upward at the lower end to point 154, and downward at the top to point 152; but rather than being fixed at these points, the end of the elongated member is restrained by a "rotational spring," i.e., moment is proportional to slope. This spring is made up of the portion of the elongated member between the actual end and the bracing point 154 or 152. While shortening the effective length of the elongated member will tend to make it less flexible, this influence is small compared to the larger flexibility introduced by the so-called "rotational spring."

The location of the braced points 152 and 154 is determined such that the moment at each of these points and its adjacent end of the elongated member shall be equal in magnitude. One way in which the distance from the end of the elongated member to the braced point, which is called A, may be determined is from the following Equation 14:

(14) $$A = C \cdot \sqrt{\frac{EI}{T}}$$

where

E is the elastic modulus of the material making up the elongated member,

I is the cross-sectional moment of inertia of the elongated member,

T is the tension in the elongated member, and

C is a positive number which is selected so that it satisfies the transcendental Equation 15:

(15) $$\{C[\cosh(C)-1]-2\sinh(C)\}=0$$

The value of C is about 2.4.

Thus it is seen that the required lateral flexibility is more easily obtained.

While the above embodiments of the invention have been described with considerable detail, it is to be understood that various modifications of the device can be made without departing from the scope or spirit of the invention.

We claim:

1. An offshore structure for use in a body of water having a floor which comprises:
    a floating structure supported by said body of water;
    elongated tubular members connecting and anchoring said structure to anchor means in the floor of the body of water;
    upper stop means near the upper ends and lower stop means near the lower ends of said tubular members to restrict the angular deflection of said tubular members, said upper stop means supported from said floating structure and said lower stop means supported from the floor of said body of water.

2. A structure as defined in claim 1 in which each said stop means includes a ring surrounding each elongated tubular member and means to rigidly support each such rings.

3. A structure as defined in claim 1 in which each said stop means includes as a single stop means a first ring and a second ring, said second ring being between said first ring and the end of said tubular member, said second ring member having a smaller diameter than the first ring member of said stop means.

4. A structure as defined in claim 3 in which said first ring is about twice as far from the end of said tubular member as is said second ring.

5. A structure as defined in claim 1 in which said stop means includes two diaphragms, one elastically supported with a resiliency according to Equation 2 of the specification hereof from said floating structure and the other similarly elastically supported from the floor of said body of water, as a part of said stop means and in which said elongated member passes through said diaphragm in intimate contact therewith.

6. A structure as defined in claim 1 in which said stop means includes a post member supported within said elongated member and terminating near one end thereof and extending to within the ocean floor and spacer means between said post member and said elongated member.

7. Structure for relieving stresses at the top and bottom of an elongated tubular member which is used to connect a floating structure supported by a body of water to anchors in the floor thereof, which comprises:

a first ring-like member surrounding said elongated tubular member near the lower end thereof and a second ring-like member near the upper end thereof;

a diaphragm within each said ring-like member, the outer periphery of said diaphragm being secured to said ring-type member, said elongated tubular member passing through said diaphragm in intimate contact therewith.

8. A structure as defined in claim 7 in which the position of the diaphragm is chosen such that the following equation (whose terms are defined in the specification) is satisfied:

(1)
$$M_{\text{all.}} = \left(\frac{H}{\gamma}\right) \left\{ \frac{\text{Sinh } (\gamma A) \cdot \text{Sinh } (\gamma b)}{\text{Sinh } \gamma(L) + \text{Sinh } (\gamma b) [\text{Cosh } (\gamma A) - 2]} \right\}$$

9. An offshore structure for relieving dogleg-type stresses which comprise a floating structure supported by a body of water;

anchors in the floor of said body of water;

elongated tubular members connecting said floating structure to said anchors;

a post member supported within each said elongated member and extending from within the ocean floor only to a point near the lower end of said elongated member;

elastic centralizers between said post and said elongated member, said elastic centralizer being the only structural connection between said elongated tubular member and said post.

10. A structure as defined in claim 9 in which said post is hollow.

11. Structure for relieving stresses at the top and bottom of elongated members which are used to connect a floating structure which is supported by a body of water to anchor means in the floor thereof, said elongated members being parallel, said floating structure being free of any other anchoring connecting to the floor thereof except for said elongated members, which comprises:

means supported from said floating structure near the upper end of each said elongated member to restrict the angular deflection of each said elongated member at such points;

means supported from the floor of said body to water near the lower end of each said elongated member to restrict the angular deflection of each said elongated member at such points.

12. An apparatus as defined in claim 11 in which said restricting means includes a brace extending from such point on said elongated member to a point on an adjacent member near the end thereof and at no other point.

References Cited
UNITED STATES PATENTS

| | | | |
|---|---|---|---|
| 3,142,344 | 7/1964 | Otteman et al. | 175—7 |
| 3,189,372 | 6/1965 | Johnson | 175—7X |
| 3,307,624 | 3/1967 | Lubinski | 166—.5 |
| 3,355,899 | 12/1967 | Koonce et al. | 61—46.5 |

JACOB SHAPIRO, Primary Examiner

U.S. Cl. X.R.

175—7